Oct. 29, 1929.  K. LURF  1,733,892
CLAMPING MEANS FOR WHEEL LATHES
Filed March 30, 1928
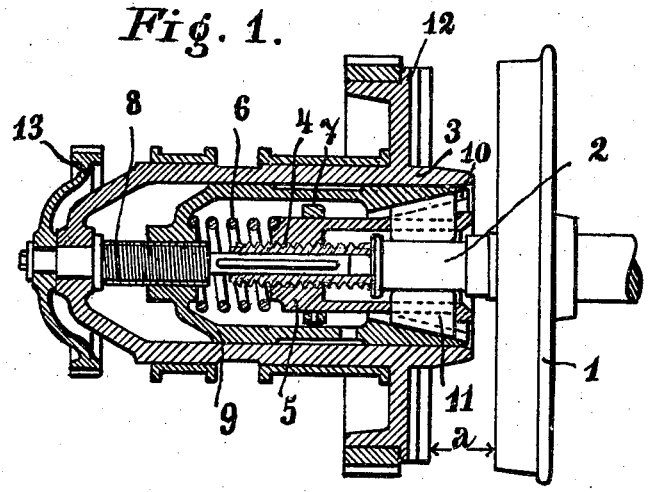
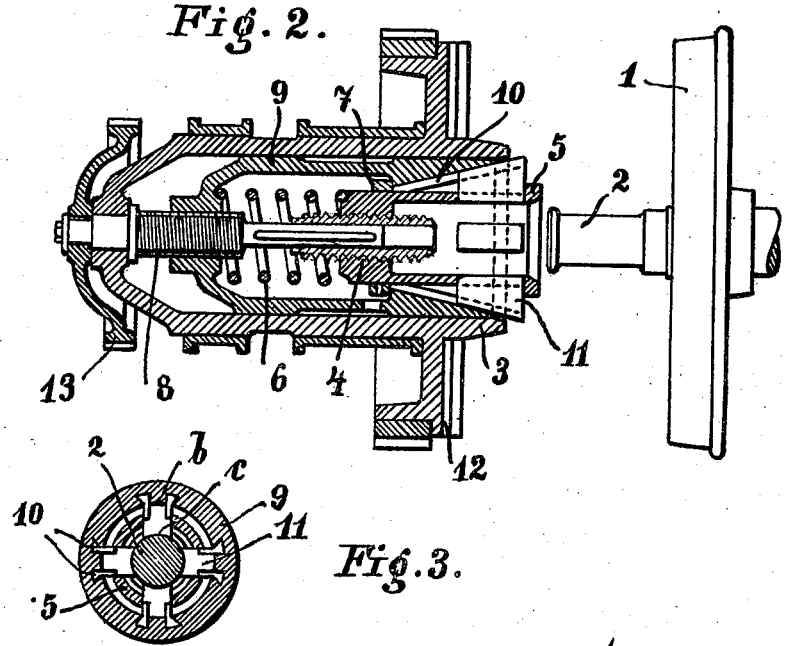
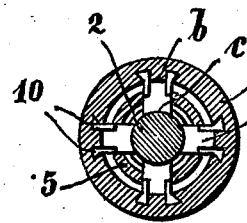

Patented Oct. 29, 1929

1,733,892

UNITED STATES PATENT OFFICE

KARL LURF, OF FRANKFORT-ON-THE-MAIN, GERMANY

CLAMPING MEANS FOR WHEEL LATHES

Application filed March 30, 1928, Serial No. 265,973, and in Germany March 30, 1927.

My invention relates to a self-centering clamping mechanism for wheel lathes for car and tender wheels, in which both the axial clamping as well as the centering of the axle in its axle journals is positively effected without the requirement of any fixed abutment.

In the well-known self-centering clamping devices in which the wheel and axle are supported in journals of the axle, centering is effected by simple spring pressure. The positive axial clamping of the axle is effected by a relative movement of the two head stocks until the flange collar of the stop spindle is arrested in the interior of the head stock spindle. The contact pressure, because of the large masses is so great that buckling of the two head stocks may be caused which is very dangerous. Also, a spring is not a reliable element, as practical experience has shown. Very small amounts of resinified oil will be sufficient in such a case to considerably reduce the spring pressure, so that an absolutely rigid and sure centering of the axle journal no longer takes place, with the result that even with a relatively small cross-section of the cutting, vibration of the wheel will be set up.

Now, the present invention has for its object to impart contrary movements to the clamping sleeve provided with inclined guides and to the resilient sleeve provided with the radial guides of the clamping jaws, the spring being completely cut out during the centering and axial clamping operation.

One embodiment of my invention is shown in the accompanying drawing in which Fig. 1 is a longitudinal section through the clamping mechanism showing the wheel in clamped position.

Fig. 2 is a similar view as Fig. 1 showing the wheel detached, while Fig. 3 shows the guide for the clamping jaws.

The wheel 1 is introduced into the machine in well-known manner and is placed at approximately the level of the centering points on a carriage of the support arranged in the center of the bed of the lathe. The tail stock is moved by a suitable electric motor mounted on the tail stock.

When advancing to the head stock, the journal 2 of the axle of the wheel 1 enters the hollow spindle 3 of the head stock, and a threaded bushing 4 in said hollow spindle is caused to bear against the end of the journal 2 of the axle.

The threaded bushing 4 is mounted in a resilient sleeve 5, so that the spring 6 is compressed, until its pressure overcomes the friction of the carriage on the support on which the wheel is placed and then forces the wheel in front of it, until the axle journal 2 enters the hollow spindle 3 of the head stock.

The threaded bushing 4 is axially displaceable on a screw-spindle 8, which has a tongue and groove portion. Both parts are so dimensioned as to be suitable for a clamping range for the axle journals of car and tender wheels. The threaded bushing 4 and the screw spindle 8 have an opposite inclination of the thread, but the pitch in the former is considerably smaller than in the latter.

The screw spindle 8 is adapted to axially move the clamping sleeve 9, the front end of which is constructed as a clamping head, and which is provided with inclined faces 10 for four clamping jaws 11.

The four jaws 11 are also guided radially in the resilient sleeve 5 and are moved therewith as the sleeve moves axially of the spindle, so that during the clamping operation they will gradually approach the axle journal due to the inclined faces 10.

The wheel is held suspended in the central position of the two discs 12, because the spring pressures compensate one another and the distance $a$ between said discs and the wheel tire (Fig. 1) is equal on both sides of the spindle so that the wheel will always occupy the correct position relative to the tools in the tool holder, without requiring adjustment against outside abutments. As soon as said distance $a$ is reached, the movement of the head stock is automatically stopped and the tail stock is arrested.

The positive clamping is now started by the rotation of the screw spindle 8 by means of a hand wheel, or a transmission gear 13. The clamping sleeve 9 being prevented from rotation, is thereby moved forward in an axial direction, so that the clamping jaws 11 are forced by the inclined faces 10 against the axle journal 2. At the same time, the sleeve 5 is pulled into the clamping sleeve 9 because the threaded bushing 4 bears against the end of the axle journal and the clamping jaws 11 are also pulled toward the inclined faces 10. The different pitches of the threads on the sleeve 4 and the spindle 9 are required in order to ensure the clamping jaws 11 against any axial movement during the clamping of the axle journal.

The wheel is released by an operation executed in the reverse order, in that at first the spindle is raised so the clamping jaws will automatically open as the hand stock is moved back.

The set collar 7 ensures the clamping jaws 11 to open only to the greatest diameter, that is to say, a little wider than the collar at the end of the axle journal. The jaws are so constructed that they are only loosely guided on the inclined faces 10, while the pressure is produced, on the one hand, in the turned cone of the sleeve 9 and on the other hand on the axle journal 2.

The jaws 11 are also so constructed that their outer conical faces are made corresponding to the smallest diameter, whilst the bore through the jaws is bored corresponding to the largest diameter of the work to be clamped, so that the jaws always will come to rest in the center at $b$ and $c$ (Fig. 2). Thus, neither the axle journal nor the conical seat will be damaged by pressure.

I claim:

In a wheel-lathe, the combination with the hollow spindle of the head stock, of a clamping sleeve axially movable in said hollow spindle and having inclined guide faces, a resiliently supported sleeve axially movable relative to said clamping sleeve, movable clamping jaws carried by said resilient sleeve in contact with said guide faces, a screw-spindle engaging said clamping sleeve, and a threaded bushing supported by said screw-spindle and engaging said resilient sleeve, said screw-spindle and threaded bushing having oppositely inclined threads, the said threaded bushing when abutting the end of the axle journal of a wheel causing upon rotation of said screw-spindle a positive relative movement of said clamping sleeve and said resilient sleeve.

In testimony whereof I affix my signature.

KARL LURF.